March 25, 1930.  G. E. McCLOSKEY  1,751,591
VALVE
Filed March 15, 1926
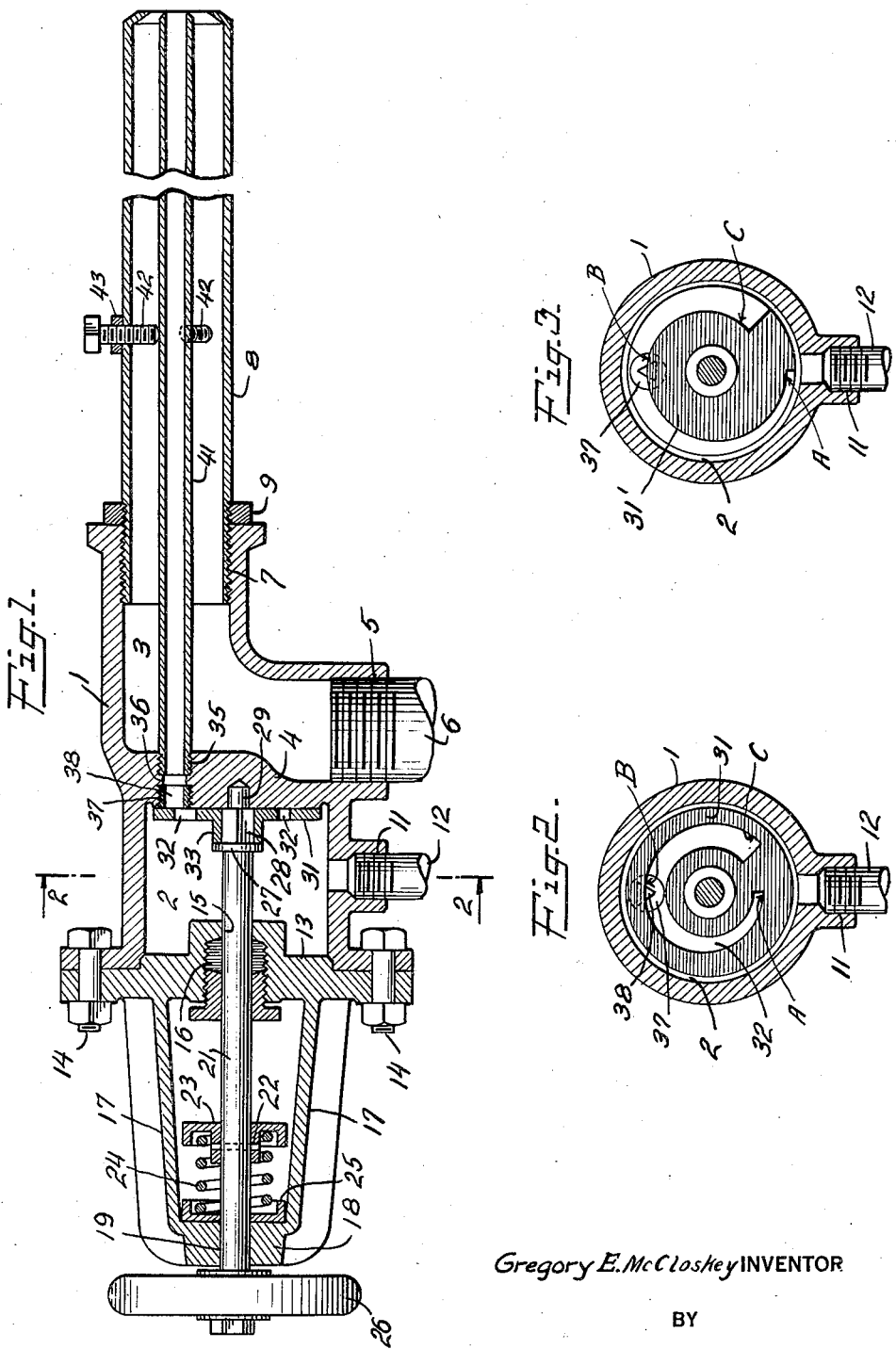
Gregory E. McCloskey INVENTOR
BY
Daniel J. Mayne ATTORNEY Patented Mar. 25, 1930

1,751,591

UNITED STATES PATENT OFFICE

GREGORY E. McCLOSKEY, OF SOUTH ORANGE, NEW JERSEY, ASSIGNOR TO THE BARRETT COMPANY, A CORPORATION OF NEW JERSEY

VALVE

Application filed March 15, 1926. Serial No. 94,631.

This invention relates to valves and more particularly to a valve consisting of a plate and orifice member for the control of the flow of liquids.

Valves consisting of a plate of one kind or another placed over an opening have been constructed heretofore, such for instance as the type in which a plate provided with holes of various diameters is disposed over an orifice, as illustrated by U. S. Patent #1,231,447. Valves of the type heretofore known have, however, been open to the objection of clogging, improper and inaccurate control and improper degree of variation of control. Furthermore in the type comprising a plate having vari-diameter holes there is an interruption of flow when changing the rate of flow. This is highly inconvenient for efficient operation.

With the idea of eliminating the undesirable features inherent in prior known valves and to produce a valve accurate in control and simple and rugged in construction, I have invented a valve which consists, in its inventive concept, of a suitable housing in which is located an orifice thru which the liquid is to flow. Over this orifice is disposed a relatively flat plate. Certain segments of the plate are cut by an approximately circular slot of increasing width, a part of which slot is adapted to coincide with the orifice. The flow of liquid thru the orifice may, therefore, be regulated by controlling the area of the orifice uncovered by the orifice plate.

In the accompanying drawings I have shown as illustrative of the possibilities of my invention, its embodiment in a fuel burner. In these drawings, in which like reference characters represent like parts, Figure 1 is a longitudinal section of a burner embodying my invention, Figure 2 is a sectional view thereof taken along the line 2—2 of Figure 1.

Figure 3 is a similar sectional view embodying a modification.

Referring more specifically to the drawings, reference character 1 designates a body comprising chambers 2 and 3 and a separating wall 4. In the lower portion of chamber 3 is an opening 5 into which is threaded an inlet pipe 6. At the right hand end of chamber 3 is an opening 7 into which is threaded a casing 8 held in place by a lock nut 9.

In the lower portion of chamber 2 is an opening 11 into which is threaded an inlet pipe 12. For covering the large opening at the left end of chamber 2, a face plate 13 is provided and adapted to be secured in place by bolts 14. The face plate and end of the chamber may be machined so as to permit a tight joint or a gasket (not shown) may be inserted between the two surfaces. In the center of the plate 13, is provided a circular hole 15 and a stuffing box 16. Protruding from the face plate are arms 17 joining together as at 18. The portion 18 is provided with a hole 19. In the rod 21 and slightly to the left of the middle thereof may be located a hole 22. The left end of the rod 21 is inserted in the hole 15 and stuffing box 16 whereupon the thrust plate 23, spring 24 and thrust plate 25 are positioned upon the rod, the thrust plate 23 being secured in position by a pin inserted therethru and driven into the hole 22. The end of the rod is then passed thru the hole 19 and a hand wheel 26 is secured to the end of the rod in any suitable and well known manner. The right end of rod 21 is provided with a shoulder 27, square portion 28 and reduced portion 29 which latter is circular in cross-section.

The orifice plate 31 is provided with a substantially circular slot 32 of increasing diameter as is clearly shown in Figures 1 and 2. This slot cuts a segment of the plate, equivalent to approximately 325° and is formed with the inner portion bounded by a segment of a circle and with the outer portion bounded by a segment of an helix. I may choose to bound the slot in vice versa fashion, to wit, with the circle outside and helix inside, positioning the orifice member oppositely as will readily be seen to be possible. Thus a valve surface of substantially constantly varying character is provided, comprising that portion of the plate which is adjacent to the helix. Although the orifice plate may be of a thickness slightly greater than the length of the squared portion 28 on rod 21 it is more expedient to make the orifice plate relatively thin as shown and provide therefore an extension 33, which may be either separate from or integral with the plate 31, the total thickness of the two being slightly greater than the length of the squared portion 28 of rod 21. In the center of the orifice plate 31 and extension 33 is provided a square opening of such size as to form a sliding fit upon the squared portion 28 of rod 21.

Centered with respect to the chamber 2 and in the left face of the wall 4 is located a blind hole to receive, with sliding fit, the reduced portion 29 of rod 21. In the upper central portion of the wall 4 is located a hole 35 threaded at both ends thereof and provided with a shoulder 36. In the left end of the hole 35 and flush with the left face of the wall 4 is inserted an orifice member 37 provided with an orifice 38. I have chosen to illustrate the orifice 38 as triangular, being my preferred embodiment but I have tried other types of orifices such as circular, square, rectangular, elliptical etc. and intend that the claims appended hereto shall cover any type of orifice. When using the triangular orifice it is ordinarily so positioned that the apex of the triangle points downwardly. In the right end of the hole 35 is inserted a pipe 41 positioned centrally, with respect to the casing 8, by screws 42 placed at 120° intervals. The screws 42 may be locked by nuts 43. The shoulder 36 operates as a stop for both the orifice member 37, and the pipe 41.

The orifice member 37 having been positioned, the left face of the wall 4 is machined as is also the right face of the orifice plate 31. Thus a tight and accurate joint is possible.

The casing 8 and pipe 41 having been positioned and the assembly of the cover plate 13 and rod 21 having been made, the orifice plate 31 is positioned upon the squared portion 28 of the rod 21. The plate 13 is then bolted securely in place, the reduced portion 29 of the rod 21 being positioned in the central hole in the left face of wall 4. The spring 24 thrusts the orifice plate 31 firmly against the wall 4. Indicating means of well known types may be embodied in the hand wheel 26 if desired, to show the position of the orifice plate at all times.

It will readily be observed from an inspection of Figure 2, that when the orifice plate 31 is rotated so that the point A is made to coincide with the orifice member 37, no flow of a liquid from chamber 2 into the pipe 41 can occur. Conversely, when the orifice plate is rotated so that the point C is made to coincide with the orifice member, the flow of a liquid from chamber 2 into the pipe 41 thru the orifice is unobstructed. Any desired flow between maximum and minimum may be obtained depending upon the position of the orifice plate and consequent area of the orifice uncovered. If point B is made to coincide with the orifice, a little less than half flow is permitted and similarly any other positioning of the orifice plate permits a flow, determined by the area of the orifice uncovered. It will be observed that the rate of flow may be changed in a very minute degree and this without any interruption of flow such as would occur were the orifice plate provided with vari-sized holes.

As a liquid fuel burner or spray the device is operated as follows: Steam or a gas such as air is forced into chamber 3 thru the pipe 6. The liquid fuel is forced into chamber 2 thru the pipe 12. The orifice plate is positioned at the desired point by rotating the hand wheel 26 to the required position. The liquid thus is forced thru the orifice and into the pipe 41 and the rush of steam or air thru the casing 8 causes a spray to be emitted from the lip of pipe 41. Suitable control is provided in the pipes 6 and 12 for regulating the gaseous and liquid pressures respectively.

In Figure 3, I have shown a modified construction of my orifice plate. Instead of being provided with a slot, the orifice plate 31' is provided with an irregular circumference comprising an helix thruout its major portion. By reversing the position of the orifice member so that the apex of the orifice points upwardly, the same effect is produced, when the orifice plate 31' is disposed in different positions, as is effected by the rotation of the plate 31 in its previously described embodiment. To use the plate 31' in the fuel burner it is only necessary to substitute plate 31' for plate 31 and to rotate the orifice member 37 thru an angle of 60°.

Obviously, the use of my invention is not confined to a fuel burner since it may be employed wherever the average valve is used. For instance if the hole 5 were closed and the casing 8 and pipe 41 removed, an ordinary L would be provided in which, hole 11 is the inlet and hole 7 is the outlet.

In some instances it may be desirable to use a sliding orifice plate provided with a slot of increasing width. The plate may then be slid backward or forward in order to uncover varying areas of the orifice.

The advantages of my invention are many, chief of which are that a very accurate and minute variation of the flow of liquid thru the valve may be obtained and clogging does not easily occur. If, when the orifice is nearly closed, clogging should accidentally occur the orifice may be "flushed" out by merely rotating the orifice plate to a more open position momentarily.

In the claims, orifice plate and valve member and aperture and orifice are used synonymously, respectively.

I claim:

1. In combination, a body comprising two chambers having a wall therebetween, an orifice member fixed in said wall and having an aperture with an apex, and a valve member rotatably positioned on the face of said wall, said valve member comprising a varying valve surface bounded by a segment of a spiral adapted to expose varying areas of said aperture when moved relative thereto, said apex and one end of said spiral segment coinciding to close the aperture in one position of the valve member.

2. In a device of the character described, a casing comprising two compartments having a wall therebetween, a fluid passageway through said wall and connecting said compartments, said passageway having an angular shaped orifice at one end thereof with an apex directed towards the axis of rotation of the valve member, a valve member rotatably positioned on the face of said wall and having a slot therein adapted to cooperate with said orifice to vary the open area of said orifice, said slot being of varying width and bounded upon at least one side by a segment of a spiral so that said orifice is substantially opened at one period of the rotation of said valve member and closed at another period.

In testimony whereof I affix my signature.

GREGORY E. McCLOSKEY.